United States Patent
Sasaki

(10) Patent No.: US 8,144,165 B2
(45) Date of Patent: Mar. 27, 2012

(54) COLOR PROCESSING APPARATUS, COLOR PROCESSING METHOD, AND COMPUTER READABLE MEDIUM STORING COLOR PROCESSING PROGRAM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1399 days.

(21) Appl. No.: 11/727,746

(22) Filed: Mar. 28, 2007

(65) Prior Publication Data

US 2008/0062330 A1 Mar. 13, 2008

(30) Foreign Application Priority Data

Sep. 11, 2006 (JP) ................ P2006-245876

(51) Int. Cl.
| | |
|---|---|
| G09G 5/00 | (2006.01) |
| G06K 9/00 | (2006.01) |
| G06T 1/00 | (2006.01) |
| H04N 1/60 | (2006.01) |
| H04N 1/46 | (2006.01) |
| H04N 9/64 | (2006.01) |
| G03F 3/08 | (2006.01) |
| G03F 15/00 | (2006.01) |

(52) U.S. Cl. ........ 345/600; 345/581; 345/589; 345/591; 345/606; 348/254; 348/557; 358/523; 358/518; 382/167; 382/274; 382/300

(58) Field of Classification Search ........... 345/428, 345/581, 589–591, 600–606, 643, 549; 348/253–254, 553–557, 708, 671; 382/162–167, 382/254, 274, 276, 300; 358/1.9, 523, 518, 358/519
See application file for complete search history.

(56) References Cited

U.S. PATENT DOCUMENTS

| 5,537,638 | A | * | 7/1996 | Morita et al. ................ 345/426 |
|---|---|---|---|---|
| 6,125,199 | A | * | 9/2000 | Sato et al. .................... 382/162 |
| 6,198,553 | B1 | * | 3/2001 | Yamamoto et al. .......... 358/520 |
| 6,320,668 | B1 | * | 11/2001 | Kim ............................. 358/1.1 |
| 2002/0157009 | A1 | * | 10/2002 | Yamamoto et al. .......... 713/189 |
| 2003/0071823 | A1 | * | 4/2003 | Fukasawa .................... 345/589 |
| 2003/0164828 | A1 | * | 9/2003 | Hung ........................... 345/426 |
| 2004/0091055 | A1 | * | 5/2004 | Williams ...................... 375/259 |
| 2005/0102044 | A1 | * | 5/2005 | Kohn et al. ..................... 700/28 |
| 2005/0231740 | A1 | * | 10/2005 | Uchino ......................... 358/1.9 |
| 2005/0285891 | A1 | * | 12/2005 | Deer et al. ..................... 347/19 |
| 2006/0285531 | A1 | * | 12/2006 | Howard et al. .............. 370/343 |
| 2010/0067030 | A1 | * | 3/2010 | Imai et al. .................... 358/1.9 |

FOREIGN PATENT DOCUMENTS

JP 2002-84434 3/2002

* cited by examiner

*Primary Examiner* — Wesner Sajous
(74) *Attorney, Agent, or Firm* — Morgan, Lewis & Bockius LLP

(57) ABSTRACT

A color processing apparatus includes an image signal acquisition section, a color conversion matrix storage section, a matrix regularization processing section and a normal color conversion section. The image signal acquisition section acquires an image signal containing a predetermined input color signal. The color conversion matrix storage section stores information of a color conversion matrix which associates the input color signal and an output color signal with each other. The matrix regularization processing section reads the information of the color conversion matrix from the color conversion matrix storage section and converts the color conversion matrix into a nonsingular matrix. The normal color conversion section converts the input color signal acquired by the image signal acquisition section into an output color signal using the nonsingular matrix.

12 Claims, 7 Drawing Sheets

COLOR PROCESSING APPARATUS, COLOR PROCESSING METHOD, AND COMPUTER READABLE MEDIUM STORING COLOR PROCESSING PROGRAM

TECHNICAL FIELD

The invention relates to a color processing apparatus used to convert a color signal, for example.

RELATED ART

For example, to cause one color output device to output with using a color signal of another color output device, it is necessary to convert the color signal if the color output devices use color signals in different color spaces.

SUMMARY none

BRIEF DESCRIPTION OF THE DRAWINGS

Exemplary embodiments of the invention will be described in detail below with reference to the accompanying drawings wherein.

DETAILED DESCRIPTION

Figure 1:
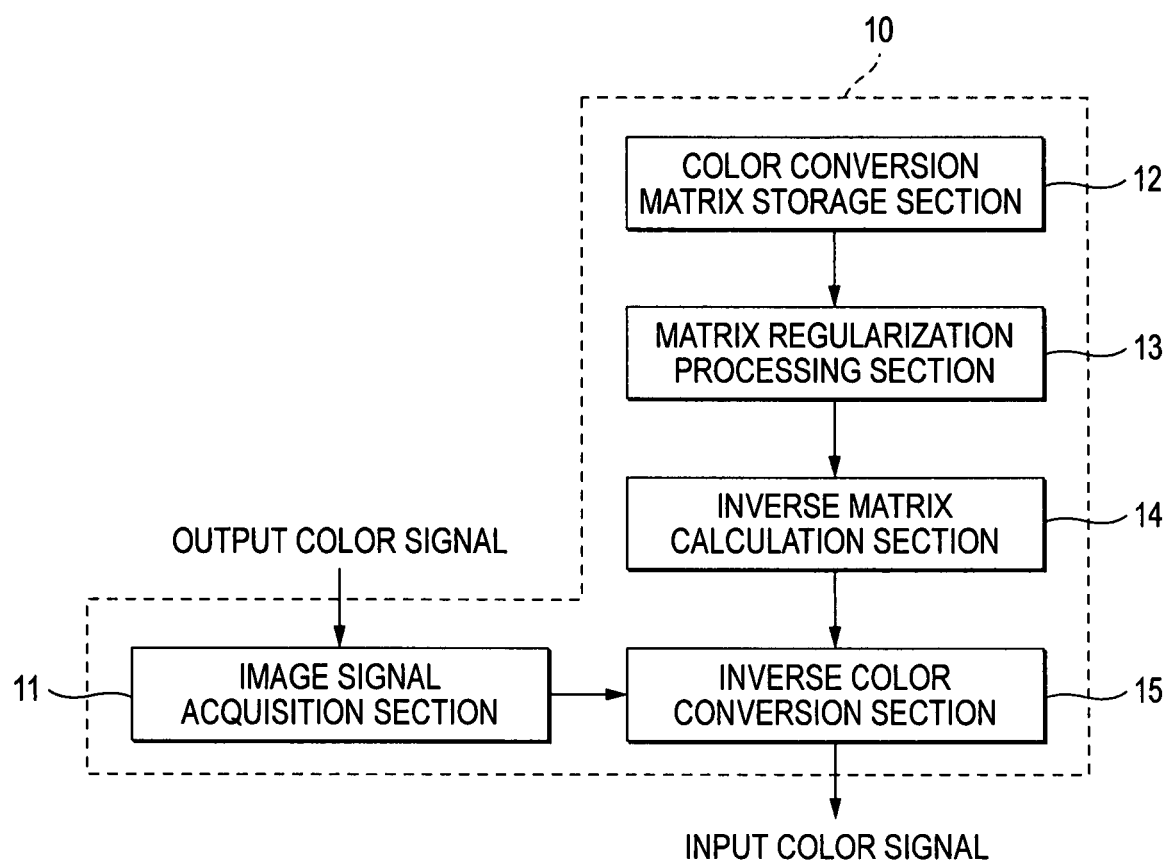
FIG. 1 is a block diagram to show the function of a color processing apparatus incorporating an exemplary embodiment of the invention.

Exemplary embodiments of the invention will be described in detail. However, it is to be understood that the invention is not limited to the following exemplary embodiments and various modifications may be made thereto without departing from the spirit and the scope of the invention.

In the case where a color conversion from one color space to a different color space is executed, for example, in the case where a color conversion from one standard color space to another standard color space such as a color conversion from sRGB to sYCbCr is executed, a particular conversion matrix is defined.

In the case where an inverse conversion, that is, a color conversion from sYCbCr to sRGB is executed, an inverse matrix of the conversion from sRGB to sYCbCr may be used.

Since a conversion matrix between the standard color spaces always has an inverse matrix, an unstable value is not calculated in the color conversion from sYCbCr to sRGB (inverse conversion).

However, a conversion definition from a device-dependent color space, which depends on, for example, a color output device, to a device-independent color space such as L*a*b* varies in association relation, depending on the color measurement environment and statuses of the devices.

A model of such a conversion from a device-dependent color space, which depends on, for example, a color output device, to a device-independent color space is often established with actual measurement data, and used to predict color conversion characteristics.

For example, it is assumed that the color output device is a printer that uses CMYK as color signals and the device-independent color space independent is L*a*b*.

Actual measurement data may be obtained by preparing color patches in CMYK values, measuring the color patched output from the printer with a calorimeter to calculate L*a*b* values and associates the CMYK values with the L*a*b* values.

At this time, if there are the association relations between the CMYK values of 1,000 patches and the L*a*b* values, color not contained in the patches can be predicted sufficiently.

However, even if a highly accurate calorimeter is used, usually measured L*a*b* values have variations, that is, color measurement error.

A method of statistically modeling the color conversion characteristic based on the actual measurement data having such variations is called "characterization" or a "color prediction model."

On the other hand, a neural network may be caused to learn the association relations between the CMYK values and the L*a*b* values and the neutral network after the learning may be used as a color prediction model.

However, the color conversion characteristic is not always straightforward. For example, a color prediction model for a printer that uses CMYK as color signals may have an area where a change amount in L*a*b* value is extremely small relative to a change amount in CMYK value.

Such an area is a low-sensitive area for the color prediction model, and a prediction result largely depends on small fluctuation in L*a*b* value.

In such a case, if a K value is large, the low-sensitive area easily occurs and may be handled as a special area.

If a color conversion in the low-sensitive area is executed with a color conversion matrix, a value of determinant of the matrix may be extremely small and calculation to find the inverse matrix may be unstable.

If the calculation to find the inverse matrix are unstable, CMYK values calculated by the inverse conversion of a color (color conversion from L*a*b* to CMYK) result in divergence solutions ((a solution impossible to be taken calculationally)).

Also, when a color signal is converted into another color space, the case where a necessary inverse matrix becomes unstable is not limited to the case where there is the area where the association relation between color signals is low sensitive as described above.

If a color conversion matrix has nature that it does not have an inverse matrix, a solution to finding of the inverse matrix diverges and there is a possibility that a program for finding the inverse matrix may stop.

Thus, to create such a program safe in terms of calculation, it is important for the color conversion matrix itself to be safe one having an inverse matrix (that is, to be a nonsingular matrix).

Then, in view of the above, the exemplary embodiment provides the following method.

FIG. 1 is a block diagram to show the function of a color processing apparatus 10 to which the exemplary embodiment of the invention is applied.

The color processing apparatus 10 shown in FIG. 1 includes an image information acquisition section 11 that acquires an image signal containing a predetermined output color signal from an external computer (not shown), for example. The color processing apparatus 10 also includes a color conversion matrix storage section 12 that stores a color conversion matrix which is information used to execute a color conversion into another color space. The color processing apparatus 10 further includes a matrix regularization processing section 13 that regularizes the color conversion matrix read by a control section (not shown) to calculate a nonsingular matrix, an inverse matrix calculation section 14 that calculates an inverse matrix from the nonsingular matrix, and an inverse color conversion section 15 that executes a color conversion of the output color signal using the inverse matrix to provide an input color signal.

Figure 2:
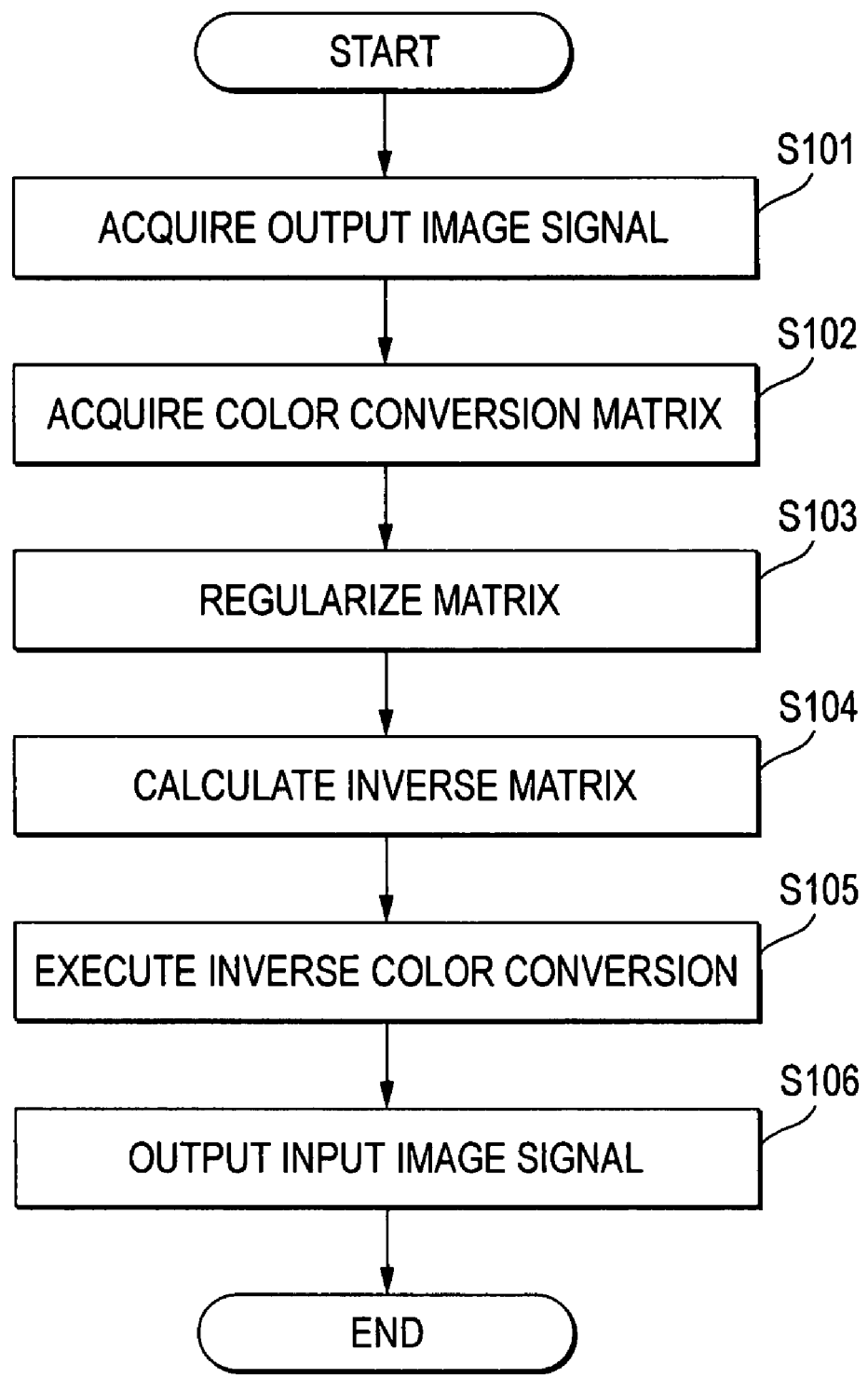
FIG. 2 is a flowchart to show the operation of the color processing apparatus incorporating the exemplary embodiment of the invention.

FIG. 2 is a flowchart to show the operation of the color processing apparatus 10.

The color processing apparatus 10 to which the exemplary embodiment is applied will be described in detail with reference to FIGS. 1 and 2. Color conversion from L*a*b* to CMY will be described by way of example.

The image information acquisition section 11 acquires an image signal containing a predetermined output color signal from the external computer as described above (step 101). Here, the image information acquisition section 11 acquires the color signal of L*a*b* as the output color signal.

The color conversion matrix storage section 12 stores a color conversion matrix which is information used to execute a color conversion to another color space. The control section (not shown) acquires the color conversion matrix which is information used to execute a color conversion from CMY to L*a*b* (step 102).

The color conversion matrix can be determined, for example, by weighting data of the actual measurement data in the vicinity of given CMY and executing the regression analysis on the weighted data.

Let a color conversion matrix S thus calculated be $$S = \begin{pmatrix} s_{11} & s_{12} & s_{13} \\ s_{21} & s_{22} & s_{23} \\ s_{31} & s_{32} & s_{33} \end{pmatrix} \quad (1)$$

In this case, a color conversion from CMY to L*a*b* in the vicinity of a given L*a*b* color signal can be executed according to the following expression 2:

$$\begin{pmatrix} L^* \\ a^* \\ b^* \end{pmatrix} = S \begin{pmatrix} C \\ M \\ Y \end{pmatrix} = \begin{pmatrix} s_{11} & s_{12} & s_{13} \\ s_{21} & s_{22} & s_{23} \\ s_{31} & s_{32} & s_{33} \end{pmatrix} \begin{pmatrix} C \\ M \\ Y \end{pmatrix} \quad (2)$$

To calculate a CMY color signal from a L*a*b* color signal, an inverse conversion of the expression 2 may be executed. This inverse conversion can be executed according to the following expression 3:

$$\begin{pmatrix} C \\ M \\ Y \end{pmatrix} = S^{-1} \begin{pmatrix} L^* \\ a^* \\ b^* \end{pmatrix} = \begin{pmatrix} s_{11} & s_{12} & s_{13} \\ s_{21} & s_{22} & s_{23} \\ s_{31} & s_{32} & s_{33} \end{pmatrix}^{-1} \begin{pmatrix} L^* \\ a^* \\ b^* \end{pmatrix} \quad (3)$$

If the matrix S is not nonsingular, the inverse matrix $S^{-1}$ does not exist and a divergence solution is calculated. If the quality of the actual measurement data is poor, there is a possibility that the matrix S may not be nonsingular.

Then, to prevent a divergence solution from being calculated, the matrix regularization processing section 13 optimizes components of the matrix S so that the matrix S becomes nonsingular (step 103).

The matrix S does not have an inverse matrix if a determinant of the matrix |S| is equal to 0 (|S|=0). In the exemplary embodiment, to avoid this situation, the following parameter $\lambda$ is introduced and is added to the diagonal components of the matrix S.

$$S_{opt} = \begin{pmatrix} s_{11}+\lambda & s_{12} & s_{13} \\ s_{21} & s_{22}+\lambda & s_{23} \\ s_{31} & s_{32} & s_{33}+\lambda \end{pmatrix} \quad (4)$$

|S|=0 if any of the diagonal components of the matrix S is equal to 0. Therefore, for example, if the numeric value $\lambda$ other than 0 is added to the diagonal components as in the expression 4, none of the diagonal components of the matrix S is equal to 0.

Although the color processing apparatus 10 may have $\lambda$ as a fixed parameter, for example, $\lambda$ may be derived according to the following method.

First, a proper initial value is assigned to $\lambda$, whereby CMY values are calculated from L*a*b* values according to the expression 5 shown below. L*a*b* values are calculated from the calculated CMY values according to the expression 6 shown below, and a search is made for $\lambda$ so that a difference between the calculated L*a*b* values and the original L*a*b* values becomes minimum.

$$\begin{pmatrix} C \\ M \\ Y \end{pmatrix} = S_{opt}^{-1} \begin{pmatrix} L^* \\ a^* \\ b^* \end{pmatrix} = \begin{pmatrix} s_{11}+\lambda & s_{12} & s_{13} \\ s_{21} & s_{22}+\lambda & s_{23} \\ s_{31} & s_{32} & s_{33}+\lambda \end{pmatrix}^{-1} \begin{pmatrix} L^* \\ a^* \\ b^* \end{pmatrix} \quad (5)$$

$$\begin{pmatrix} L^* \\ a^* \\ b^* \end{pmatrix} = S_{opt} \begin{pmatrix} C \\ M \\ Y \end{pmatrix} = \begin{pmatrix} s_{11}+\lambda & s_{12} & s_{13} \\ s_{21} & s_{22}+\lambda & s_{23} \\ s_{31} & s_{32} & s_{33}+\lambda \end{pmatrix} \begin{pmatrix} C \\ M \\ Y \end{pmatrix} \quad (6)$$

The search procedure is as follows. Let the given L*a*b* values be $(L_0, a_0, b_0)$. A proper initial value $\lambda$ is assigned to expression 5 and $(C_\lambda, M_\lambda, Y_\lambda)$ of CMY values after conversion is calculated according to the following expression 7.

$$\begin{pmatrix} C_\lambda \\ M_\lambda \\ Y_\lambda \end{pmatrix} = S_{opt}^{-1} \begin{pmatrix} L_o \\ a_o \\ b_o \end{pmatrix} = \begin{pmatrix} s_{11}+\lambda & s_{12} & s_{13} \\ s_{21} & s_{22}+\lambda & s_{23} \\ s_{31} & s_{32} & s_{33}+\lambda \end{pmatrix}^{-1} \begin{pmatrix} L_o \\ a_o \\ b_o \end{pmatrix} \quad (7)$$

The Calculated $(C_\lambda, M_\lambda, Y_\lambda)$ is assigned to the expression 6 and $(L_\lambda, a_\lambda, b_\lambda)$ is calculated according to the following expression 8.

$$\begin{pmatrix} L_\lambda \\ a_\lambda \\ b_\lambda \end{pmatrix} = S_{opt} \begin{pmatrix} C_o \\ M_o \\ Y_o \end{pmatrix} = \begin{pmatrix} s_{11}+\lambda & s_{12} & s_{13} \\ s_{21} & s_{22}+\lambda & s_{23} \\ s_{31} & s_{32} & s_{33}+\lambda \end{pmatrix} \begin{pmatrix} C_\lambda \\ M_\lambda \\ Y_\lambda \end{pmatrix} \quad (8)$$

A distance d between $(L_0, a_0, b_0)$ and $(L_\lambda, a_\lambda, b_\lambda)$ thus calculated can be represented by the following expression 9.

$$d = \sqrt{(L_0-L_\lambda)^2+(a_0-a_\lambda)^2+(a_0-a_\lambda)^2} \quad (9)$$

A search is made for $\lambda$ so that the distance d lessens as much as possible and that $\lambda$>0, and the found $\lambda$ is adopted. Accordingly, a nonsingular matrix can be obtained for enabling an inverse matrix to be calculated and a color conversion of a color signal to be executed without resulting in a divergence solution.

In the exemplary embodiment, it is not necessary to use the same $\lambda$ for all diagonal components, and different $\lambda$ may be used for each diagonal component as described below.

In this case, the expression 4 can be expressed by the following expression 10.

$$S_{opt} = \begin{pmatrix} s_{11}+\lambda_1 & s_{12} & s_{13} \\ s_{21} & s_{22}+\lambda_2 & s_{23} \\ s_{31} & s_{32} & s_{33}+\lambda_3 \end{pmatrix} \quad (10)$$

$\lambda_1$, $\lambda_2$, and $\lambda_3$ can be optimized separately according to a similar procedure to that described above. Also, a nonsingular matrix for enabling an inverse matrix to be calculated can be obtained.

The inverse matrix calculation section 14 calculates an inverse matrix from the calculated nonsingular matrix (step 104).

The inverse color conversion section 15 executes an inverse color conversion from L*a*b* which is the output color signal to CMY which is the input color signal, using the inverse matrix (step 105). Last, the inverse color conversion section 15 outputs the obtained image signal as the input color signal (step 106).

Further, in the exemplary embodiment, the above-described method may also be applied to color conversion from one color space to another color space, which is different from the one color space in dimensions.

For example, the case where a color conversion from L*a*b* to CMYK is executed will be described.

Since a color conversion matrix for executing the color conversion from CMYK to L*a*b* is involved in conversion from a four-dimensional space to a three-dimensional space, the inverse conversion from L*a*b* to CMYK cannot be uniquely determined because of shortage of the number of known quantities.

Thus, generally a solution is calculated by giving any one or more of C, M, Y, and K values in addition to the L*a*b* values. Usually, a value of K is often given. Therefore, in the following description, it is assumed that the value of K is given.

In this case, the image information acquisition section 11 acquires image information containing an output color signal of L*a*b* from the external computer (step 101).

The color conversion matrix storage section 12 stores a color conversion matrix which is information used to execute a color conversion from CMYK to L*a*b*. The control section (not shown) acquires the color conversion matrix (step 102).

The color conversion matrix can be determined, for example, by weighting data of the actual measurement data in the vicinity of given L*a*b* and executing the regression analysis on the weighted data as in the above description.

Let the color conversion matrix be S. Here, the color conversion from CMYK to L*a*b* can be executed according to the following expression 11.

$$\begin{pmatrix} L^* \\ a^* \\ b^* \end{pmatrix} = S \begin{pmatrix} C \\ M \\ Y \\ K \end{pmatrix} = \begin{pmatrix} s_{11} & s_{12} & s_{13} & s_{14} \\ s_{21} & s_{22} & s_{23} & s_{24} \\ s_{31} & s_{32} & s_{33} & s_{34} \end{pmatrix} \begin{pmatrix} C \\ M \\ Y \\ K \end{pmatrix} \quad (11)$$

Let the color components of the given L*a*b* values and K values be $(L_0, a_0, b_0)$ and $K_0$. Here, the expression 11 becomes the following expression 12.

$$\begin{pmatrix} L_o \\ a_o \\ b_o \end{pmatrix} = S \begin{pmatrix} C \\ M \\ Y \\ K_o \end{pmatrix} = \begin{pmatrix} s_{11} & s_{12} & s_{13} & s_{14} \\ s_{21} & s_{22} & s_{23} & s_{24} \\ s_{31} & s_{32} & s_{33} & s_{34} \end{pmatrix} \begin{pmatrix} C \\ M \\ Y \\ K_o \end{pmatrix} \quad (12)$$

The expression (12) is transformed into the following expression 13:

$$\begin{pmatrix} L_o \\ a_o \\ b_o \end{pmatrix} = \begin{pmatrix} s_{11} & s_{12} & s_{13} \\ s_{21} & s_{22} & s_{23} \\ s_{31} & s_{32} & s_{33} \end{pmatrix} \begin{pmatrix} C \\ M \\ Y \end{pmatrix} + \begin{pmatrix} s_{14}K_o \\ s_{24}K_o \\ s_{34}K_o \end{pmatrix} \quad (13)$$

From the expression (13), the CMY values can be calculated according to the following expression 14.

$$\begin{pmatrix} C \\ M \\ Y \end{pmatrix} = \begin{pmatrix} s_{11} & s_{12} & s_{13} \\ s_{21} & s_{22} & s_{23} \\ s_{31} & s_{32} & s_{33} \end{pmatrix}^{-1} \begin{pmatrix} L_o - s_{14}K_o \\ a_o - s_{24}K_o \\ b_o - s_{34}K_o \end{pmatrix} \quad (14)$$

Next, the matrix regularization processing section 13 optimizes the matrix components so that color conversion of a color signal can be executed without resulting in a divergence solution (step 103).

That is, a parameter $\lambda$ is introduced into the color conversion matrix in the expression 14 and is added to the components of the matrix.

$$\begin{pmatrix} C \\ M \\ Y \end{pmatrix} = \begin{pmatrix} s_{11}+\lambda & s_{12} & s_{13} \\ s_{21} & s_{22}+\lambda & s_{23} \\ s_{31} & s_{32} & s_{33}+\lambda \end{pmatrix}^{-1} \begin{pmatrix} L_o - s_{14}K_o \\ a_o - s_{24}K_o \\ b_o - s_{34}K_o \end{pmatrix} \quad (15)$$

At this time, the color conversion matrix is similar to that in the expression 4 and therefore, a procedure of finding a nonsingular matrix can be executed in a similar manner to that described above.

The processing after the nonsingular matrix is found is similar to that described above and therefore will not be described again.

Although the examples of the color conversion from CMY to L*a*b* and the color conversion from CMYK to L*a*b* have been described, if the color conversion matrix has an inverse matrix and the inverse matrix does not involve a calculational problem, a color conversion may be executed as it is.

Figure 3:
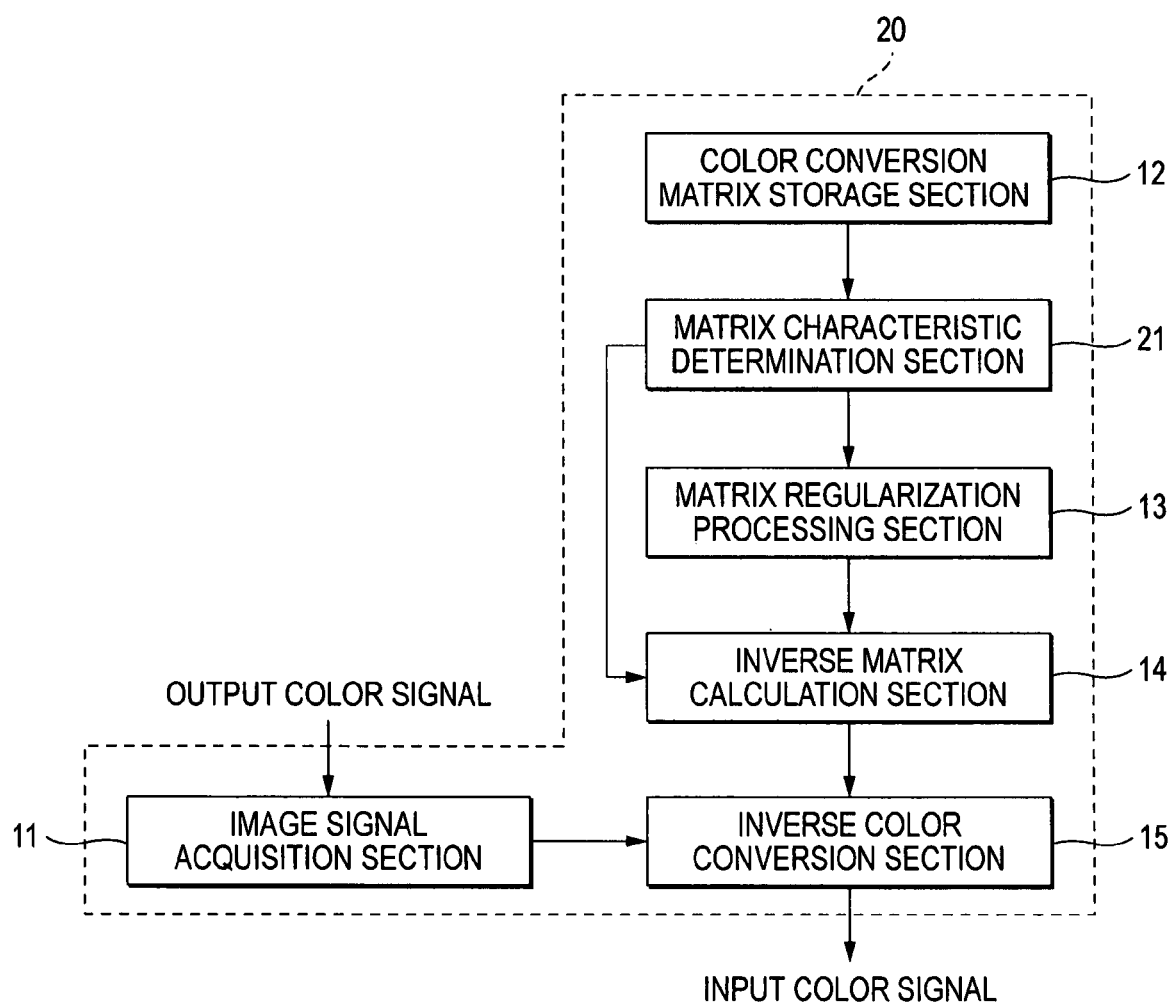
FIG. 3 is a block diagram to show the function of a color processing apparatus provided by adding a matrix characteristic determination section to the color processing apparatus incorporating the exemplary embodiment of the invention in FIG. 1.

FIG. 3 is a block diagram to show the function of a color processing apparatus 20 provided by adding a matrix characteristic determination section 21 to the color processing apparatus 10 shown in FIG. 1.

Figure 4:
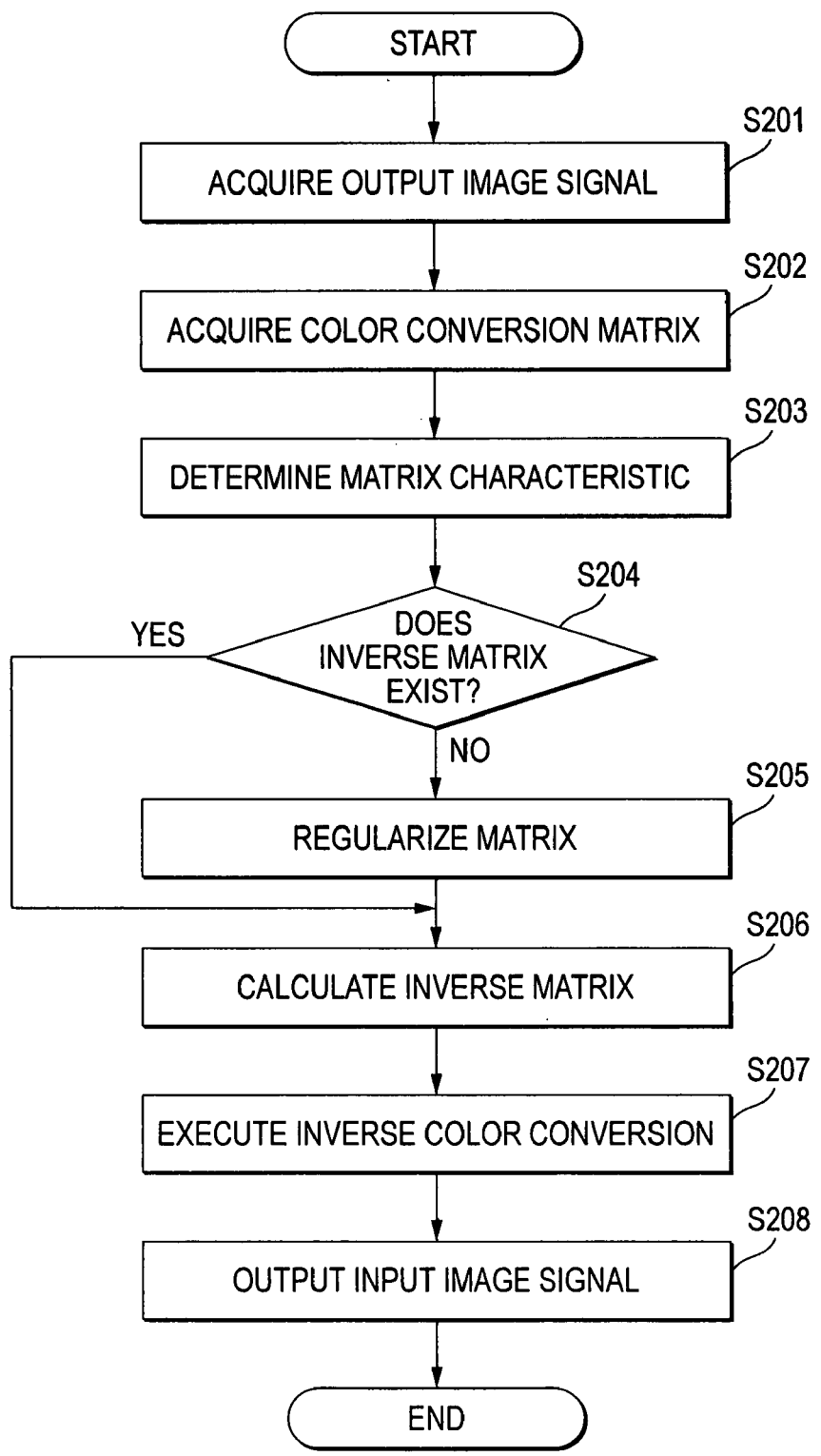
FIG. 4 is a flowchart to show the operation of the color processing apparatus in FIG. 3 incorporating the exemplary embodiment of the invention.

FIG. 4 is a flowchart to show the operation of the color processing apparatus 20.

In the color processing apparatus 20 shown in FIG. 3, the matrix characteristic determination section 21 determines as to whether or not a color conversion of a color signal can be executed so that the matrix does not result in a divergence solution (step 203).

A criterion of the determination made by the matrix characteristic determination section 21 is as follows. If the determinant of the matrix is close to 0, there is high possibility that the inverse matrix may be divergent. In this case, the matrix characteristic determination section 21 determines that no inverse matrix exists (step 204) and the matrix regularization processing section 13 regularizes the matrix (step 205). Otherwise, control is transferred to the inverse matrix calculation section 14 (step 204) and the inverse matrix is calculated (step 206).

The determination of the matrix characteristic described above may be executed only with diagonal components.

Of course, the color processing method according to the exemplary embodiment can be applied not only to the inverse color conversion from L*a*b* to CYM or from L*a*b* to CYMK, but also to a normal color conversion from CYM to L*a*b* or from CYMK to L*a*b*.

Figure 5:
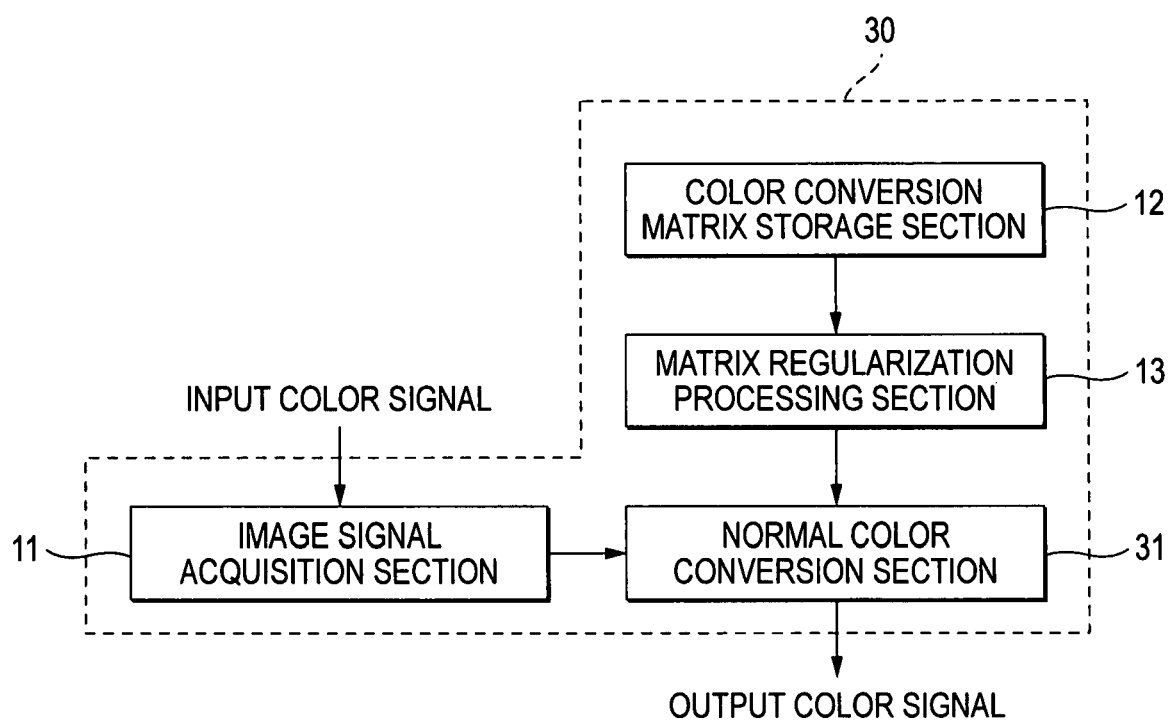
FIG. 5 is a block diagram to show the function of a color processing apparatus for executing normal color conversion as a modified example of the color processing apparatus incorporating the exemplary embodiment of the invention.

FIG. 5 is a block diagram to show the function of a color processing apparatus 30 for executing a normal color conversion as a modified example of the color processing apparatus to which the exemplary embodiment of the invention is applied.

Figure 6:
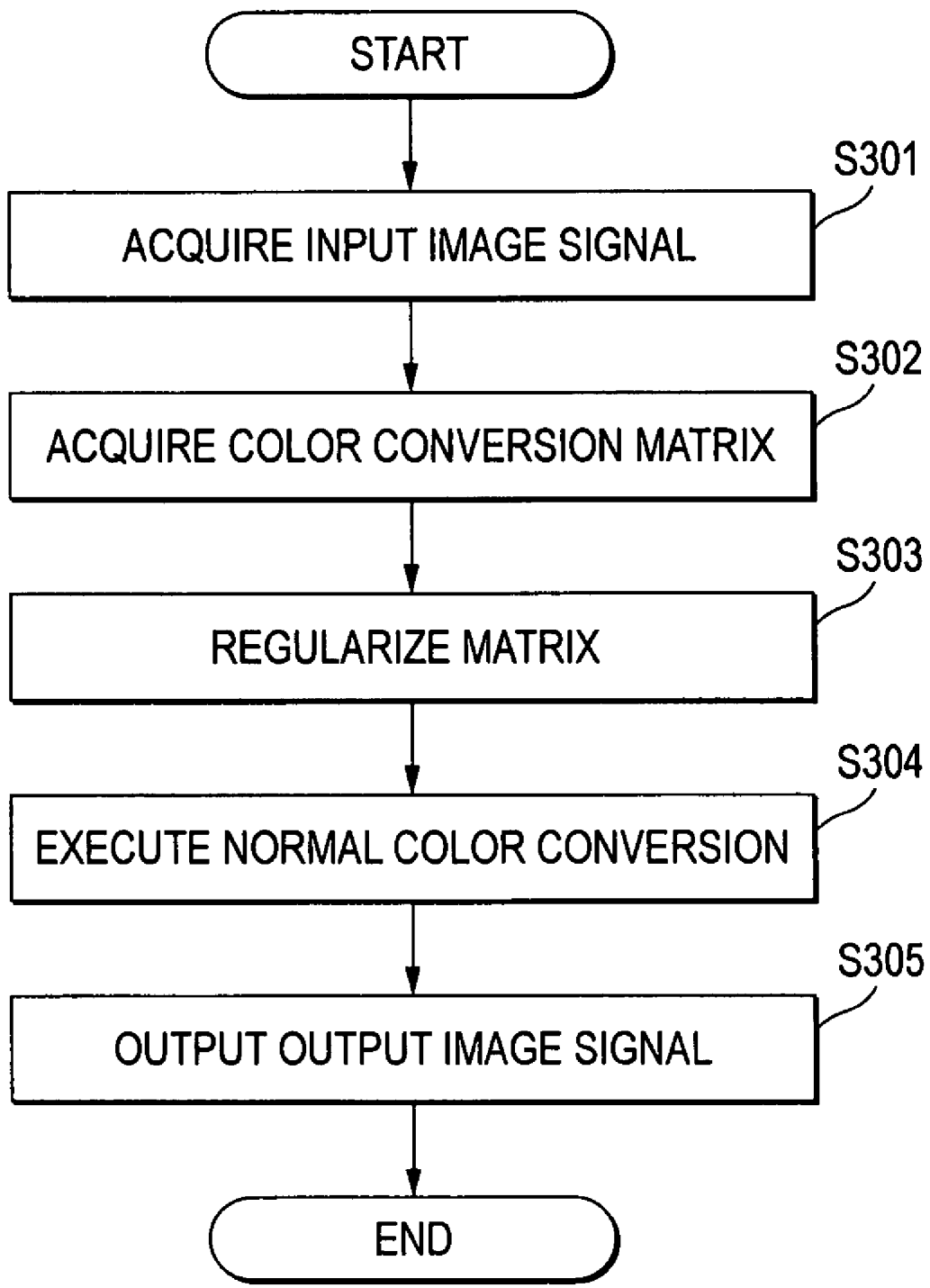
FIG. 6 is a flowchart to show the operation of the color processing apparatus in FIG. 5 incorporating the exemplary embodiment of the invention.

FIG. 6 is a flowchart to show the operation of the color processing apparatus 30.

A color conversion from CYMK to L*a*b* will be described by way of example.

In this case, the matrix regularization processing section 13 calculates a nonsingular matrix (step 303). Since the nonsingular matrix can be used as a color conversion matrix without calculating an inverse matrix, a normal color conversion section 31 may use the matrix to execute the color conversion (step 304).

The exemplary embodiment has been described by taking the case where the color signals of CMYK and CMY are handled as an example. However, it should be noted that the invention is not limited thereto. The invention can also be applied to RGB color signals, CMYKRGB color signals, etc., in a similar manner and may be applied not only to color conversion using the L*a*b* color signals, but also to color conversion using XYZ color signals and YCbC color signals. The invention is useful for all processing wherein operations concerning a color conversion matrix are required.

Figure 7:
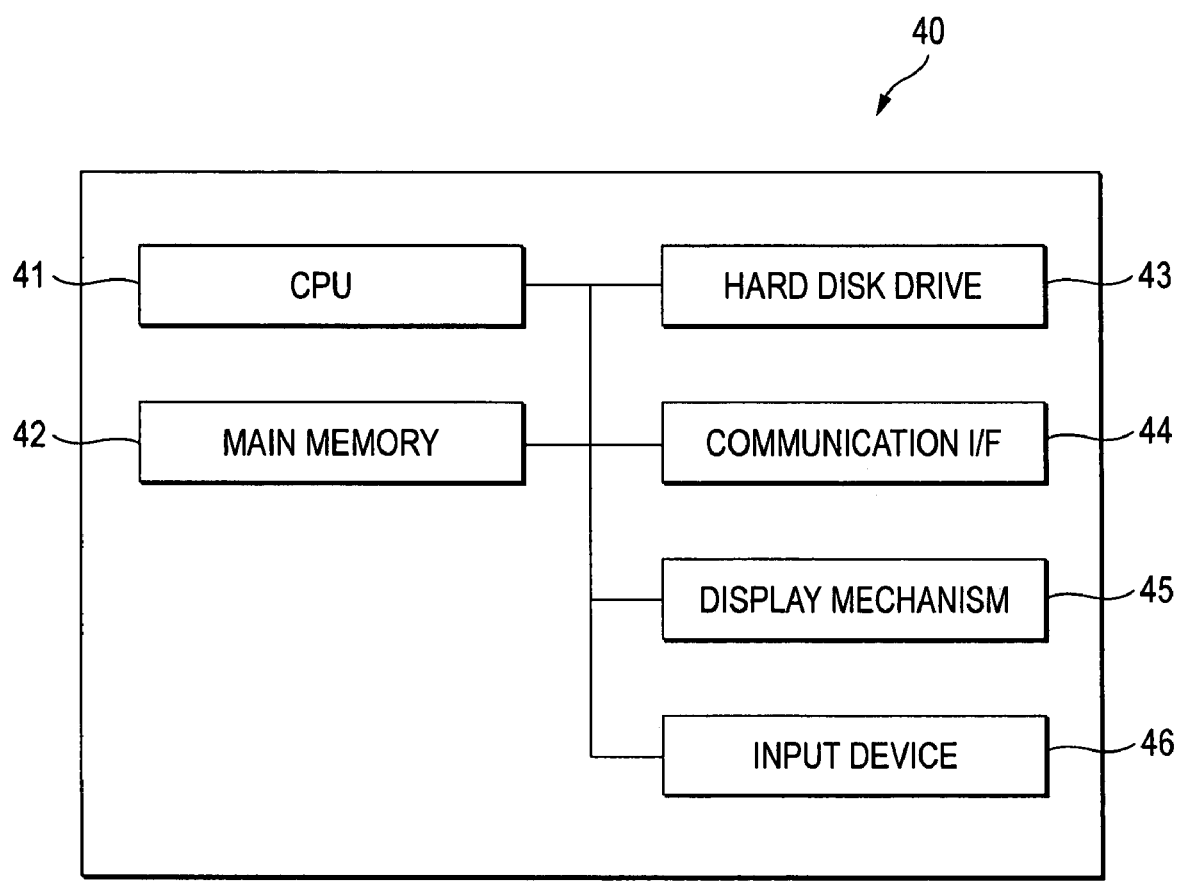
FIG. 7 is a block diagram to show an example of the hardware configuration of a color processing apparatus incorporating the exemplary embodiment of the invention.

FIG. 7 is a block diagram to show an example of the hardware configuration of a color processing apparatus 40 incorporating the exemplary embodiment of the invention.

The color processing apparatus 40 shown in FIG. 7 includes a CPU (Central Processing Unit) 41 of computation means, main memory 42 of storage means, and a communication I/F 44 for conducting external communications. The CPU 41 executes various types of software of an OS (Operating System), application, etc., to implement the functions described above. The main memory 42 is a storage area for storing the various types of software, data used in execution of the software, and the like. The communication I/F 44 inputs/outputs an image signal of a predetermined color signal.

The color processing apparatus 40 may further include a hard disk drive (HDD) 43 of a storage area for storing input data to the various types of software, output data from the various types of software, etc., a display mechanism 45 made up of video memory, a display, etc., an input device 46 of a keyboard, a mouse, etc., and the like.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
   an image signal acquisition section that acquires an image signal containing a predetermined input color signal;
   a color conversion matrix storage device that stores information of a color conversion matrix which associates the input color signal and an output color signal with each other;
   a matrix regularization processing section that reads the information of the color conversion matrix from the color conversion matrix storage device, and converts the color conversion matrix into a nonsingular matrix to prevent a divergence solution from being calculated; and
   a normal color conversion section that converts the input color signal acquired by the image signal acquisition section into an output color signal using the nonsingular matrix.

2. The apparatus according to claim 1, wherein the matrix regularization processing section converts the color conversion matrix by
   adding a parameter to components of the color conversion matrix;
   comparing a first output color signal obtained using the color conversion matrix without the parameter and a second output color signal obtained using the color conversion matrix with the added parameter; and
   optimizing the parameter based on the comparison result.

3. A color processing apparatus comprising:
   an image signal acquisition section that acquires an image signal containing an output color signal;
   a color conversion matrix storage device that stores information of a color conversion matrix which associates the output color signal and an input color signal with each other;
   a matrix regularization processing section that reads the information of the color conversion matrix from the color conversion matrix storage device and converts the color conversion matrix into a nonsingular matrix to prevent a divergence solution from being calculated;
   an inverse matrix calculation section that calculates an inverse matrix from the nonsingular matrix; and an inverse color conversion section that converts the output color signal acquired by the image signal acquisition section into an input color signal using the inverse matrix.

4. The apparatus according to claim 3, wherein the matrix regularization processing section converts the color conversion matrix by adding a parameter to components of the color conversion matrix;

comparing a first output color signal obtained using the color conversion matrix without the parameter and a second output color signal obtained using the color conversion matrix with the added parameter; and optimizing the parameter based on the comparison result.

5. A color processing method programmed to be executable by a computer comprising:

acquiring by the computer an image signal containing a predetermined input color signal;

acquiring by the computer information of a color conversion matrix which associates the input color signal and an output color signal with each other;

converting by the computer the acquired color conversion matrix into a nonsingular matrix to prevent a divergence solution from being calculated; and converting by the computer the acquired input color signal into an output color signal using the nonsingular matrix.

6. The method according to claim 5, wherein the converting of the color conversion matrix into the nonsingular matrix comprises steps of:

adding a parameter to components of the color conversion matrix;

comparing a first output color signal obtained using the color conversion matrix without the parameter and a second output color signal obtained using the color conversion matrix with the added parameter; and optimizing the parameter based on the comparison result.

7. A color processing method programmed to be executable by a computer comprising:

acquiring by the computer an image signal containing a predetermined output color signal;

acquiring by the computer information of a color conversion matrix which associates the output color signal and an input color signal with each other;

converting by the computer the acquired color conversion matrix into a nonsingular matrix to prevent a divergence solution from being calculated;

calculating by the computer an inverse matrix from the nonsingular matrix; and converting by the computer the acquired output color signal into an input color signal using the inverse matrix.

8. The method according to claim 7, wherein the converting of the color conversion matrix into the nonsingular matrix comprises steps of:

adding a parameter to components of the color conversion matrix;

comparing a first output color signal obtained using the color conversion matrix without the parameter and a second output color signal obtained using the color conversion matrix with the added parameter; and optimizing the parameter based on the comparison result.

9. A non-transitory computer readable recording medium storing a program causing a computer to execute a process for color conversion, the process comprising:

acquiring by the computer an image signal containing a predetermined input color signal;

acquiring by the computer information of a color conversion matrix which associates the input color signal and an output color signal with each other;

converting by the computer the acquired color conversion matrix into a nonsingular matrix to prevent a divergence solution from being calculated; and converting by the computer the acquired input color signal into an output color signal using the nonsingular matrix.

10. The medium according to claim 9, wherein the converting of the color conversion matrix into the nonsingular matrix comprises steps of:

adding a parameter to components of the color conversion matrix;

comparing a first output color signal obtained using the color conversion matrix without the parameter and a second output color signal obtained using the color conversion matrix with the added parameter; and optimizing the parameter based on the comparison result.

11. A non-transitory computer readable recording medium storing a program causing a computer to execute a process for color conversion, the process comprising:

acquiring by the computer an image signal containing a predetermined output color signal;

acquiring by the computer information of a color conversion matrix which associates the output color signal and an input color signal with each other;

converting by the computer the acquired color conversion matrix into a nonsingular matrix to prevent a divergence solution from being calculated;

calculating by the computer an inverse matrix from the nonsingular matrix; and converting by the computer the acquired output color signal into an input color signal using the inverse matrix.

12. The medium according to claim 11, wherein the converting of the color conversion matrix into the nonsingular matrix comprises steps of:

adding a parameter to components of the color conversion matrix;

comparing a first output color signal obtained using the color conversion matrix without the parameter and a second output color signal obtained using the color conversion matrix with the added parameter; and optimizing the parameter based on the comparison result.

* * * * *